US010960382B2

(12) United States Patent
Prabhu et al.

(10) Patent No.: US 10,960,382 B2
(45) Date of Patent: Mar. 30, 2021

(54) CATALYST FOR ENHANCING LIQUID YIELD IN THERMAL COKING PROCESS

(71) Applicant: Indian Oil Corporation Limited, Mumbai (IN)

(72) Inventors: Kuvettu Mohan Prabhu, Faridabad (IN); Velusamy Chidambaram, Faridabad (IN); Pankaj Kumar Kasliwal, Faridabad (IN); Alex Cheru Pulikottil, Faridabad (IN); Biswanath Sarkar, Faridabad (IN); Brijesh Kumar, Faridabad (IN); Santanam Rajagopal, Faridabad (IN); Ravinder Kumar Malhotra, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 15/035,697

(22) PCT Filed: Jan. 6, 2014

(86) PCT No.: PCT/IB2014/058068
§ 371 (c)(1),
(2) Date: May 10, 2016

(87) PCT Pub. No.: WO2015/071773
PCT Pub. Date: May 21, 2015

(65) Prior Publication Data
US 2016/0263556 A1 Sep. 15, 2016

(30) Foreign Application Priority Data
Nov. 18, 2013 (IN) .......................... 3601/MUM/2013

(51) Int. Cl.
| | |
|---|---|
| *B01J 21/16* | (2006.01) |
| *B01J 21/04* | (2006.01) |
| *B01J 35/02* | (2006.01) |
| *B01J 35/10* | (2006.01) |
| *B01J 37/04* | (2006.01) |
| *B01J 37/08* | (2006.01) |
| *C10G 11/04* | (2006.01) |
| *C10G 11/02* | (2006.01) |
| *B01J 37/00* | (2006.01) |
| *B01J 35/00* | (2006.01) |
| *B01J 21/08* | (2006.01) |
| *B01J 37/06* | (2006.01) |

(52) U.S. Cl.
CPC ............... *B01J 21/16* (2013.01); *B01J 21/04* (2013.01); *B01J 21/08* (2013.01); *B01J 35/0026* (2013.01); *B01J 35/026* (2013.01); *B01J 35/1019* (2013.01); *B01J 35/1066* (2013.01); *B01J 37/0045* (2013.01); *B01J 37/0072* (2013.01); *B01J 37/04* (2013.01); *B01J 37/08* (2013.01); *C10G 11/02* (2013.01); *C10G 11/04* (2013.01); *B01J 37/06* (2013.01)

(58) Field of Classification Search
CPC ... B01J 21/04; B01J 21/16; B01J 37/04; B01J 37/06; B01J 37/08; B01J 35/1014; B01J 35/1042
See application file for complete search history.

(56) References Cited

U.S. PATENT DOCUMENTS

| | | | | |
|---|---|---|---|---|
| 4,060,480 A | * | 11/1977 | Reed .................. | B01J 21/04 208/111.15 |
| 4,542,118 A | * | 9/1985 | Nozemack ............ | B01J 29/088 502/263 |
| 5,288,739 A | * | 2/1994 | Demmel ................. | B01J 21/16 502/63 |
| 5,391,289 A | * | 2/1995 | Forde ..................... | B01J 8/005 208/113 |
| 5,998,329 A | * | 12/1999 | Derolf ................... | B01J 20/103 501/12 |
| 6,589,902 B1 | * | 7/2003 | Stamires ................ | B01J 20/10 423/625 |
| 2003/0159972 A1 | * | 8/2003 | Yu ......................... | C10G 11/05 208/113 |

FOREIGN PATENT DOCUMENTS

WO WO 2014/016764 1/2014

OTHER PUBLICATIONS

PCT/IB2014/058068, Jul. 7, 2014, International Search Report and Written Opinion.

\* cited by examiner

Primary Examiner — Jun Li
(74) Attorney, Agent, or Firm — Workman Nydegger

(57) ABSTRACT

The present invention provides a catalyst product comprising of (a) porous acidic clay material and (b) binder and matrix to shape the catalyst to either microspheres, pellet, tablet, extrudate and ring and suitable for enhancing the crack-ability of heavy feed material derived from atmospheric and vacuum distillation bottoms; FCC bottoms, coker bottoms and hydrocracker bottoms. The invention particularly relates to a catalyst cum heat supply product suitable for thermal coking process either in a batch mode or continuous coking process.

5 Claims, No Drawings

CATALYST FOR ENHANCING LIQUID YIELD IN THERMAL COKING PROCESS

FIELD OF INVENTION

The present invention is related to a catalyst product comprising of (a) porous acidic clay material and (b) binder and matrix suitable for enhancing the crack-ability of heavy feed material derived from atmospheric and vacuum distillation bottoms; FCC bottoms, coker bottoms and hydrocracker bottoms.

The invention particularly relates to a catalyst cum heat supply product suitable for thermal coking process either in a batch mode or continuous coking process.

BACKGROUND OF INVENTION

Demand for transportation fuels coupled with increased crude prices and deteriorating quality have forced refiners for enhancing liquid yields at the same time decrease the yield of undesired products like coke and dry gas. Delayed coker is one of the major non-catalytic work horse of refining industry for the production of LPG, olifinic naphtha, diesel and heavy oil operating on the principle of free radical mechanism with rejection of coke. The delayed coking process has evolved with many improvements since the mid-1930s. Delayed coking is a semi-continuous process in which the heavy feedstock is heated to a high temperature. The first patent for this technology, U.S. Pat. No. 1,831,719 discloses cracking of the hot vapor mixture in the coking receptacle before its temperature falls below 950° F. The heavy residual feed is thermally cracked in the drum to produce lighter hydrocarbons and solid, petroleum coke. This process is conducted in batches with operation time of 6-12 hrs. The main concern of refining industry is higher batch time cycle and higher coke yield. There have been continuous efforts in enhancing liquid yield with reduction in coke. In delayed coking, substantial amount of volatile matter still remains on coke which determines the overall economy of the process. The hardness of coke can be a rough measure of efficiency of the process. Lower the volatile material in the petroleum coke, higher the hardness and thus higher liquid yields. Various petroleum coke uses have specifications with volatile matter less than 12 wt %. The noteworthy commercial processes which focus towards reduction in volatile matter and the coke are Fluid coking and Flexi coking developed by Exxon Mobil. Fluid Coking®, developed since the late 1950s, is a continuous coking process that uses fluidized solids to increase the conversion of coking feedstocks to cracked liquids, and further reduce the volatile content of the product coke. In Fluid Coking®, the coking feedstock blend is sprayed into a fluidized bed of hot, fine coke particles in the reactor. Heat for the endothermic cracking reactions is supplied by the hot particles, this permits the cracking and coking reactions to be conducted at higher temperatures (about 480-565° C.) and shorter contact times than in delayed coking. The Fluid Coking technology reduces the volatile combustible matter within 4-10 wt %. Flexicoking® is an improvement of the Fluid Coking® process, in which a third major vessel is added to gasify the product coke.

U.S. Pat. No. 4,378,288 relates a process for increasing coker distillate yield in a coking process by adding a small amount, generally 0.005-10% by weight of a free radical inhibitor selected from the group consisting of hydroquinone and N-phenyl-2-naphthylamine to the coker feed material.

U.S. Pat. No. 4,455,219 relates to a process for reducing coke by substituting feed with a lower boiling range material for a part of the conventional recycle.

U.S. Pat. No. 4,832,823 refers to an improved coking process wherein a feedstock comprising residual oil is passed into a coking zone along with a highly aromatic oil such as pyrolysis tars or a decanted oil produced from a fluidized catalytic cracking zone in a concentration resulting in the feedstock having from about 5 to about 20 percent by weight of highly aromatic oil. The yield of coke is thereby reduced.

U.S. Pat. No. 5,039,390 is directed to a composition and methods for controlling undesirable coke formation and deposition commonly encountered during the high temperature processing of hydrocarbons. Coke formation can be inhibited by adding a sufficient amount of a combination of a boron compound and a dihydroxyphenol.

U.S. Pat. No. 5,415,764 refers to a process for further processing a residue remaining after vacuum distillation in a crude oil refinery, which entails subjecting the residue remaining after vacuum distillation to flash distillation, thereby producing a distillate and a residue.

U.S. Pat. No. 5,853,565 provides a method for controlling the relative proportion of products produced from a petroleum residuum by thermal coking. Coke yield promoting compounds are identified, and effective attenuating agents are specified. The method can mitigate a coke promoting effect induced by certain surfactants, antifoulants, or fugitive catalysts in thermal coking units. Mitigating the coke yield promoting effect of molybdenum, for example, in a thermal coker permits recovery of a greater proportion of distillate boiling range products.

U.S. Pat. No. 6,790,547 refers to a process for suppressing the formation of metal-containing coke during processing of a hydrocarbonaceous material, such as for example a hydrocarbon conversion processes. Electromagnetic radiation is applied to the hydrocarbonaceous material while heating the hydrocarbonaceous material to a temperature above 700 degrees F. The frequency of the electromagnetic radiation is preferably below 300 MHz. The process is particularly useful in the reforming of a hydrocarbon material for operation in a fuel cell.

U.S. Pat. No. 6,860,985 relates to a method for improving yield in petroleum streams derived from coking processes in flexicoking & fluidcoking. In a preferred embodiment, the invention relates to a method for regenerating filters employed to remove particulate matter from coker gas oil to improve coker gas oil yield and yield of upgraded coker gas oil products.

U.S. Pat. No. 7,303,664 refers to a process of delayed coking for making substantially free-flowing coke, preferably shot coke. In this process feedstock based on vacuum residuum, is heated in a heating zone to coking temperatures then conducted to a coking zone wherein volatiles are collected overhead and coke is formed. A metals-containing additive is added to the feedstock prior to it being heated in the heating zone.

U.S. Pat. No. 7,374,665 is concerning a method of blending delayed coker feedstocks to produce a coke that is easier to remove from a coker drum. A first feedstock is selected having less than about 250 wppm dispersed metals content and greater than about 5.24 API gravity. A second delayed coker feedstock is blended with said first resid feedstock so that the total dispersed metals content of the blend will be greater than about 250 wppm and the API gravity will be less than about 5.24.

U.S. Pat. No. 7,416,654 refers to a metal additives to hydrocarbon feed streams for improved hydrocarbon liquid yield during thermal cracking. Additives include metal overbases and metal dispersions and the metals suitable include, but are not necessarily limited to, magnesium, calcium, barium, strontium, aluminum, boron, zinc, silicon, cerium, titanium, zirconium, chromium, molybdenum, tungsten, and/or platinum, overbases and dispersions. Coker feedstocks and visbreaker feeds are particular hydrocarbon feed streams to which the method can be advantageously applied, but the technique may be used on any hydrocarbon feed that is thermally cracked.

U.S. Pat. No. 7,658,838, & U.S. Pat. No. 7,645,735 relate to a delayed coking process for making substantially free-flowing coke, preferably shot coke from vacuum residuum with the help of addition of about 300 to about 3,000 wppm of polymeric additive.

U.S. Pat. No. 914,668 refers to a thermal conversion process for continuously producing hydrocarbon vapor and continuously removing a free-flowing coke. The coke, such as a shot coke, can be withdrawn continuously via, e.g., a staged lock hopper system.

U.S. Pat. No. 8,147,676 relates to an improved delayed coking process in which coker feed, such as a vacuum resid, is treated with (i) a metal-containing agent and (ii) an oxidizing agent. The feed is treated with the oxidizing agent at an oxidizing temperature. The oxidized feed is then pre-heated to coking temperatures and conducted to a coking vessel for a coking time to allow volatiles to evolve and to produce a substantially free-flowing coke. A metals-containing composition is added to the feed prior to the heating of the feed to coking temperatures U.S. Pat. No. 8,206,574 refers to a reactor process added to a coking process to modify the quantity or yield of a coking process involving delayed coking, fluid coking, flexicoking, or other coking processes with additive comprising catalyst(s), seeding agent(s), excess reactant(s), quenching agent(s), carrier fluid(s), which may alumina, silica, zeolite, calcium compounds, iron compounds, activated carbon, crushed pet coke in addition new catalyst, FCCU equilibrium catalyst, spent catalyst, regenerated catalyst.

From the various prior art coking processes it can be seen that, Fluid coking and Flexi coking processes are the dynamic and continuous while, delayed coker is a batch process. In the Fluid/Flexi coking volatile combustion matter can be brought in the range 4-10 wt %, and this process has limitation in carrying required heat for sustaining endothermic cracking, vaporization reaction as well as providing required adequate strength acid sites. Though U.S. Pat. No. 8,206,574 refers to a coking process to modify the quantity or yield of a coking process involving additive comprising catalyst(s), seeding agent(s), excess reactant(s), quenching agent(s), carrier fluid(s), which may alumina, silica, zeolite, calcium compounds, iron compounds, activated carbon, crushed pet coke in addition new catalyst, FCCU equilibrium catalyst, spent catalyst, regenerated catalyst but is silent on type and strength of acid sites needed and their preparation.

Thus, the primary object of the present invention is to provide a catalyst suitable for thermal cracking process capable of providing higher heat for sustaining of endothermic cracking reaction at the same time to provide weak acid sites for enhancing cracking of bulkier hydrocarbons for enhancing of liquid yields, reduction in coke.

Another object of the present invention is to provide a suitable shape catalyst capable of withstanding rigors of fluidization, transport, stripping steps and maintaining integrity of particles with adequate ABD and attrition resistance.

Yet another object of the present invention is to provide required pore size, and surface area required for facilitating smooth entry and exit of reactants and products from the catalyst.

A further object of the present invention is to provide a catalyst material which can easily be regenerated thereby enabling the process to convey adequate heat energy for sustaining continuous reaction.

STATEMENT OF THE INVENTION

Accordingly, the present invention provides a catalyst for cracking heavy hydrocarbons, wherein the catalyst comprises a clay material, binder and matrix, wherein the catalyst is having surface area between 100-200 $m^2/gm$, heat capacity 0.9-1, ABD of 0.7 to 1 g/cc and average pore diameter in the range of 630 to 680 A°.

In an embodiment the clay is selected from kaolinite, bentonite, illite, vermiculite, smectite, montmorillonite, sepiolite and hectorite.

In another embodiment binder is an alumina selected from alumina gel, pseudoboehmite, aluminum trihydrate, eta, theta and gamma.

In still another embodiment alumina is present from 40 to 70 wt % and silica is present from 20 to 50 wt %.

In still yet another embodiment the catalyst is having shape selected from microspheroidal, pellet, extrudate, tablet, ring and irregular having from 20 to 200 micron size.

In another embodiment a process of preparing the catalyst comprising the steps of:
 a) optionally, calcining a clay;
 b) reacting alumina with an acid to obtain an alumina slurry;
 c) mixing the alumina slurry of step b) with the clay of step (a) to obtain a slurry;
 d) spray drying the slurry obtained in step c) to obtain microspheres;
 e) calcining the spray dried microspheres;
 f) treating the spray dried microspheres with an acid followed by heating;
 g) recovering the acid treated microspheres by filtering, washing and oven drying to obtain the desired catalyst.

In another embodiment the clay is selected from kaolinite, bentonite, illite, vermiculite, smectite, montmorillonite, sepiolite and hectorite.

In yet another embodiment the calcination temperature is in the range of 500 C to 1000 C.

In further another embodiment the acid of step (b) is selected from nitric acid, formic acid or acetic acid.

In still yet another embodiment the heating in step f) is performed at a temperature ranging from 85-90 degree C.

In another embodiment the acid of step f) is selected from hydrochloric acid, nitric acid, sulphuric acid, hydrofluoric acid, phosphoric acid and a mixture thereof.

SUMMARY OF THE INVENTION

The present invention provides a catalyst product comprising of (a) porous acidic clay material and (b) binder and matrix to shape the catalyst to either microspheres, pellet, tablet, extrudate and ring and suitable for enhancing the crack-ability of heavy feed material derived from atmospheric and vacuum distillation bottoms; FCC bottoms, coker bottoms and hydrocracker bottoms.

This invention further relates to the application of inorganic oxides with mild acidity for enhancing of distillate yields while thermal cracking of heavy residue feeds derived from processes of atmospheric distillation, vacuum distillation, catalytic cracker, hydrocracker, and residual coils from other refinery units.

DESCRIPTION OF INVENTION

The present invention discloses a material is selected for offering required surface area, acidity and pore diameter for sustaining of cracking of heavier hydrocarbons. The material is selected from class of clays, processed for creating required acidity, pore size and surface area insitu.

Further, a suitable binder and matrix is selected for effectively binding high surface area cracking material at the same time capable of offering required heat energy. Adequate inorganic silica in the form of colloidal shape has been employed for enhancing physical properties of catalyst such as bulk density and attrition resistance. Final catalyst when is in the shape of microspheres has ABD in the range 0.75 to 1 g/cc, attrition Index below 6, average pore diameter from 20 to 1,000°A.

The new catalytic material of this application offers higher heat required for enduring endothermic cracking reaction and also required weak acid sites for assisting cracking reaction.

As per the invention, the catalyst composition comprises of porous acidic clay bonded by alumina with a diluent normal clay, silica and aluminum trihydrate. The porous acidic clay can be produced insitu after calcination of shaped catalyst from kaolinite, bentonite, vermiculite, smectite, montmorillonite, sepiolite and hectorite. Natural beneficiated, milled clay can be in finely divided form with a size below about 5 microns. Clay can have a two-layer structure having alternating sheets of silica in tetrahedral configuration and alumina in octahedral configuration. These sheets are separated with a gap of 7.13°A. Dry atmosphere equilibrated clay has moisture content of about 15 wt %. The clay is a good source for silica and alumina with about 45 wt % of silica and 38 wt % of alumina with empirical formula $2SiO_2-Al_2O_3 \cdot 2H_2O$. Clay possesses surface area in the range 10-20 $m^2/g$ and as such does not have any catalytic activity. According to the present invention, this clay has been transformed to porous mild acidic material through high temperature calcination between 500° C. to 1000° C. followed by controlled mineral acid leaching, acid sourced from hydrochloric acid, nitric acid, sulphuric acid, hydrofluoric acid, phosphoric acid and their mixture. Calcined clay can be used or alternately normal clay containing catalyst can be subjected to high temperature calcination while acid leaching is performed on shaped catalyst employing adequate binder and fillers. Acid leaching of catalyst can pores in the range 20-1000°A with mild acidity accessible to large hydrocarbon molecules suitable for cracking heavy resin and alkyl aromatics, heavy naphthenic molecules present in heavy feeds.

While, binder can be derived from alumina especially pseudoboehmite grade which is either produced by reaction between acidic and alkaline alumina salts or by alkoxide process. Pseudoboehmite aluminas with soda, less than 0.1 wt % are ideal binders for normal and calcined clays as they are converted to glue by reacting with acids like nitric acid, formic acid or acetic acid. Glue alumina can be mixed with normal/calcined clays with or without other grades of alumina, silica source and can be produced into microspheres by spray drying technique. Other shapes can be given such as pellets, extrudes, tablets and rings employing suitable process. Once spray dried product is calcined, alumina gets transformed into gamma phase, a hard material, which holds clay and other catalyst ingredients together to form attrition resistant mass. Varieties of pseudoboehmite alumina are commercially available in different crystallite sizes and surface area. Besides, pseudoboehmite other alumina such as aluminum trihydrate, bayerit, gel alumina can also be employed as a matrix or partly serving to improve ABD and attrition resistance.

Colloidal silica is aqueous colloidal dispersions of silica particles, stabilized by the use of small quantities of soda or ammonium. These products having soda less than 0.2 wt % and can be readily used for matrix or catalyst binding purpose. These are stable between pH of 8.5 and 11.

The present disclosure provides working examples which are given by way of illustration and should not be construed to limit the scope of the disclosure.

Example 1

This example describes the process for the preparation of ready to react clay. 588 gm kaolin clay with 85% particles size below 3 micron, volatiles 15% was calcined to 950° C. for one hour and cooled to room temperature. Calcined clay was slurried in 500 cc of demineralised water (DM) containing 0.5 wt % dispersant Tamol to obtain free flowing slurry.

Example 2

This example describes a process for the preparation of acidic and porous microspheres required for carrying thermal cracking of heavy residue feed. 214 g of alumina of Pural SB Grade of Sasol was reacted with 43.9 g of formic acid at room temperature (20° C.). To the alumina, 972 g of calcined clay slurry with solid content 50% in water prepared as per example 1, above was added under stirring. Final slurry with of 2.7 with solid content 25% was spray dried to obtain microspheres with average particle size 85 microns. Spray dried product was calcined to 550° C. for one hour.

Example 3

Calcined microspheres were dispersed in 10% hydrochloric acid solution at 85° C. and kept under agitation for 3 hours. At the end, acid treated microspheres were recovered by filtration, washed thrice with fresh DM water and oven dried. Over dried product has loss on ignition of 10 wt %, surface area of 135 $m^2/g$ and ABD of 0.77 g/cc.

Example 4

This example refers to a composition where in, acidity and pore creation on clay was performed as post spray drier.

214 g of alumina of Pural SB Grade of Sasol was reacted with 43.9 g of formic acid at room temperature (20° C.). To the alumina, 574 g of normal clay slurry containing 0.5 wt % of dispersant in water was added under stirring. Final slurry with pH of 2.7 with solid content 25% was spray dried to obtain microspheres with average particle size 85 microns. Spray dried product was calcined to 950° C. for one hour. Calcined product was cooled to room temperature and dispersed in 10% hot hydrochloric acid at 85° C. and kept agitated for 3 hours. At the end, acid reacted microspheres were recovered by filtration, washed three times each time with fresh hot DM water. Washed product was oven dried for 12 hours at 120° C. This product showed ABD of 0.78 g/cc, surface area of 145 m$^2$/g.

Example 5

This example describes the process for the preparation clay in which 800 g clay with volatiles 15% was calcined at different temperature namely 300° C., 500° C. 700° C. and 950° C. for one hour.

Example 6

214 g of alumina of pural SB grade of sasol was reacted with 43.9 g of formic acid at room temperature (20° C.). To the alumina, 574 g of calcined clay at a temperature of 300° C. slurry containing 0.5 wt % of dispersant in water was added under stirring. Final slurry with pH of 2.5 with solid content 25% was spray dried to obtain microsphere with average particle size of 85 microns. Spray dried product was calcined to 550° C., 1 hour. The product 150 g was dispersed in 10% 500 ml of Hydrochloric acid and the mixture was subjected to heating at a temperature of 85° C. for 3 hours. At the end, acid reacted microspheres were recovered by filtration, washed three times with fresh hot DM water. Washed product was oven dried for 12 hours at 120° C. This product showed ABD of 0.72 g/cc, surface area of 23 m$^2$/g.

Example 7

214 g of alumina of pural SB grade of sasol was reacted with 43.9 g of formic acid at room temperature (20° C.). To the alumina, 574 g of calcined clay at a temperature of 500° C. slurry contain 0.5 wt % of dispersant in water was added under stirring. Final slurry with pH of 2.5 with solid content 25% was spray dried to obtain microsphere with average particle size of 85 microns. Spray dried product was calcined to 550° C., 1 hour. The product 150 g was dispersed in 10% 500 ml of Hydrochloric acid and the mixture was subjected to heating at a temperature of 85° C. for 3 hours. At the end, acid reacted microspheres were recovered by filtration, washed three times with fresh hot DM water. Washed product was oven dried for pH at 120° C. This product showed ABD of 0.73 g/cc, surface area of 25 m$^2$/g.

Example 8

214 g of alumina of pural SB grade of sasol was reacted with 43.9 g of formic acid at room temperature (20° C.). To the alumina, 574 g of calcined clay at a temperature of 700° C. slurry containing 0.5 wt % of dispersant in water was added under stirring. Final slurry with pH of 2.5 with solid content 25% was spray dried to obtain microsphere with average particle size of 85 microns. Spray dried product was calcined to 550° C., 1 hour. The product 150 g was dispersed in 10% 500 ml of Hydrochloric acid and the mixture was subjected to heating at a temperature of 85° C. for 3 hours. At the end, acid reacted microspheres were recovered by filtration, washed three times with fresh hot DM water. Washed product was oven dried for 12 hours at 120° C. This product showed a ABD of 0.72 g/cc, surface area of 30 m$^2$/g.

Example 9

214 g of alumina of pural SB grade of sasol was reacted with 43.9 g of formic acid at room temperature (20° C.). To the alumina, 574 g of calcined clay at a temperature of 950° C. slurry containing 0.5 wt % of dispersant in water was added under stirring. Final slurry with pH of 2.5 with solid content 25% was spray dried to obtain microsphere with average particle size of 85 microns. Spray dried product was calcined to 550° C., 1 hour. The product 150 g was dispersed in 10% 500 ml of Hydrochloric acid and the mixture was subjected to heating at a temperature of 85° C. for 3 hours. At the end, acid reacted microspheres were recovered by filtration, washed three times with fresh hot DM water. Washed product was oven dried for 12 hours at 120° C. This product showed a ABD of 0.77 g/cc, surface area of 135 m$^2$/g.

Example 10

This example refers to a composition where in, acidity and pore creation on clay was performed as post spray drier.

214 g of alumina of pural SB grade of sasol was reacted with 43.9 g of formic acid at room temperature (20° C.) To the alumina, 574 g of normal clay slurry contain 0.5 wt % of dispersant in water was added under stirring. Final slurry with pH of 2.5 with solid content 25% was spray dried to obtain microsphere with average particle size of 85 microns. Spray dried product was calcined to 950° C., one hour. Calcined product was cooled to room temperature and dispersed in 10% hot hydrochloric acid at 85° C. and kept agitated for 3 hours. At the end, acid reacted microspheres were recovered by filtration, washed three times each time with fresh hot DM water. Washed product was oven dried for 12 hours at 120° C. This product showed a ABD of 0.78 g/cc, surface area of 145 m$^2$/g.

Example 11

This process describes a process for the preparation of modified clay.

1000 g calcined clay (300° C., 500° C. ° C., 700° C. and 950° C.) was dispersed in 10% hydrochloric acid solution at 85 to 90° C. and kept under agitation for 3 hours. At the end, acid treated clay was recovered by filtration, washed thrice with fresh hot DM water and oven dried. Oven dried product is called as modified clay.

Example 12

214 g of alumina of pural SB grade of sasol was reacted with 43.9 g of formic acid at room temperature (20° C.). To the alumina, 574 g modified clay which was calcined at a temperature of 300° C. slurry containing 0.5 wt % of dispersant in water was added under stirring. Final slurry with pH of 2.5 with solid content 25% was spray dried to obtain microsphere with average particle size of 85 microns. Spray dried product was calcined to 550° C., 1 hour. This product showed ABD of 0.70 g/cc, surface area of 42 m$^2$/g.

Example 13

214 g of alumina of pural SB grade of sasol was reacted with 43.9 g of formic acid at room temperature (20° C.). To the alumina, 574 g modified clay which was calcined at a temperature of 500° C., slurry containing 0.5 wt % of dispersant in water was added under stirring. Final slurry with pH of 2.5 with solid content 25% was spray dried to obtain microsphere with average particle size of 85 microns. Spray dried product was calcined to 550° C., 1 hour. This product showed ABD of 0.71 g/cc, surface area of 35 m$^2$/g.

Example 14

214 g of alumina of pural SB grade of sasol was reacted with 43.9 g of formic acid at room temperature (20° C.). To the alumina, 574 g modified clay which was calcined at a temperature of 700° C. slurry containing 0.5 wt % of dispersant in water was added under stirring. Final slurry with pH of 2.5 with solid content 25% was spray dried to obtain microsphere with average particle size of 85 microns. Spray dried product was calcined to 550° C., 1 hour. This product showed ABD of 0.71 g/cc, surface area of 43.9 m$^2$/g.

Example 15

214 g of alumina of pural SB grade of sasol was reacted with 43.9 g of formic acid at room temperature (20° C.). To the alumina, 574 g modified clay which was calcined at a temperature of 950° C. slurry containing 0.5 wt % of dispersant in water was added under stirring. Final slurry with pH of 2.5 with solid content 25% was spray dried to obtain microsphere with average particle size of 85 microns. Spray dried product was calcined to 550° C., 1 hour. This product showed ABD of 0.70 g/cc, surface area of 85 m$^2$/g.

Performance Evaluation of Catalyst

Performance evaluation was conducted using VR having CCR 23 wt %. Experiments were conducted at three temperature i.e 490, 500 and 510° C. using catalyst formulation at atmospheric pressure.

TABLE 1

|  | Example 10 | | Example 10 | | Example 10 | |
|---|---|---|---|---|---|---|
|  | 490 Base | 490 Base + catalyst (Example 10) | 500 Base | 500 Base + catalyst (Example 10) | 510 Base | 510 Base + catalyst (Example 6) |
| Gas | 10 | 12 | 12 | 14 | 14 | 15 |
| Liquid | 60 | 68 | 58 | 65 | 55 | 63 |
| coke | 30 | 20 | 30 | 21 | 31 | 22 |
|  | 100 | 100 | 100 | 100 | 100 | 100 |

TABLE 2

In the table performance evaluation was conducted at a temperature of 490° C. using catalyst formulation of examples 6, 9 10 and 15 at atmospheric pressure.

|  | Example 10 | | Example 9 | | Example 15 | | Example 6 | |
|---|---|---|---|---|---|---|---|---|
|  | 490 Base | 490 Base + catalyst (Example 10) | 490 Base | 490 Base + catalyst (Example 11) | 490 Base | 490 Base + catalyst (Example 15) | 490 Base | 490 Base + catalyst (Example 6) |
| Gas | 10 | 12 | 10 | 11 | 10 | 11 | 10 | 10 |
| Liquid | 60 | 68 | 60 | 67 | 60 | 61 | 60 | 60 |
| coke | 30 | 20 | 30 | 22 | 30 | 28 | 30 | 30 |
|  | 100 | 100 | 100 | 100 | 100 | 100 | 100 | 100 |

TABLE 3

Physico-chemical properties of catalyst compositions: The table provides the properties such as surface area, ABD and average pore diameter of the Examples 5 to 15.

| Examples | Description | SA m$^2$/g | ABD g/cc | Av. pore dia. (Angstrom) |
|---|---|---|---|---|
| Example 5 | Calcination of clay | | | |
| Example 6 | Microspheres of Calcined Clay (300° C.) and Alumina& post leaching | 23 | 0.72 | |
| Example 7 | Microspheres of Calcined Clay (500° C.) and Alumina & post leaching | 25 | 0.73 | |
| Example 8 | Microspheres of Calcined Clay (700° C.) and alumina & post leaching | 30 | 0.72 | |
| Example 9 | Microspheres of Calcined Clay (950° C.) and Alumina & post leaching | 135 | 0.77 | 640 |
| Example 10 | Microsphere of clay & Alumina Calined @ 950° C., Post Leaching | 145 | 0.78 | 674 |
| Example 11 | Leaching of calcined clay | | | |
| Example 12 | Microsphere of Leached clay which is calcined @300° C. and alumina | 42 | 0.70 | |
| Example 13 | Microsphere of Leached clay which is calcined @500° C. and alumina | 35 | 0.71 | |
| Example 14 | Microsphere of Leached clay which is calcined @700° C. and alumina | 40 | 0.71 | |
| Example 15 | Microspheres of Leached Clay and alumina | 85 | 0.70 | |

It is concluded from Table 2 and 3 that the catalysts formed according to examples 9 and 10 where the surface area between 100-200 m²/gm, ABD of 0.7 to 1 g/cc and average pore diameter in the range of 630 to 680 A° would result in reducing coke in the cracking of heavy hydrocarbon.

We claim:

1. A process of preparing a catalyst for cracking of heavy hydrocarbons, wherein the process consists of:
   a) calcining clay having a surface area between 10-20 m²/g a temperature in a range of 300–950° C.;
   b) dispersing the calcined clay in about 10% hydrochloric acid solution at a temperature of about 85° C. under agitation for about 3 hours to obtain an acid treated clay;
   c) filtering the acid treated clay and washing with demineralized water;
   d) drying to obtain a modified clay;
   e) preparing a slurry of the modified clay in water using 0.5 wt % dispersant;
   f) reacting a pseudoboehmite alumina with an acid to obtain an alumina slurry;
   g) mixing the alumina slurry with the slurry of modified clay to obtain a slurry having a pH of 2.5 and a solid content of 25%;
   h) spray drying the slurry obtained in step (g) to obtain microspheres having average particle size of 85 microns;
   i) calcining the spray dried microspheres at a temperature of 550° C. for an hour to obtain the desired catalyst having an ABD (apparent bulk density) of 0.70 g/cc and a surface area of 85 m²/g.

2. The process according to claim 1, wherein the clay is selected from kaolinite, bentonite, illite, vermiculite, smectite, montmorillonite, sepiolite and hectorite.

3. The process according to claim 1, wherein the acid of step (f) is selected from nitric acid, formic acid or acetic acid.

4. The process according to claim 1, wherein the dispersant is Tamol®, which is a neutral sodium salt of an arylsufonic acid.

5. The process according to claim 1, wherein calcining the clay is carried out at a temperature of 950° C.

* * * * *